March 25, 1947.  A. F. KALMAR  2,417,933
METHOD OF TREATING POTATOES
Filed Jan. 19, 1944  2 Sheets-Sheet 1
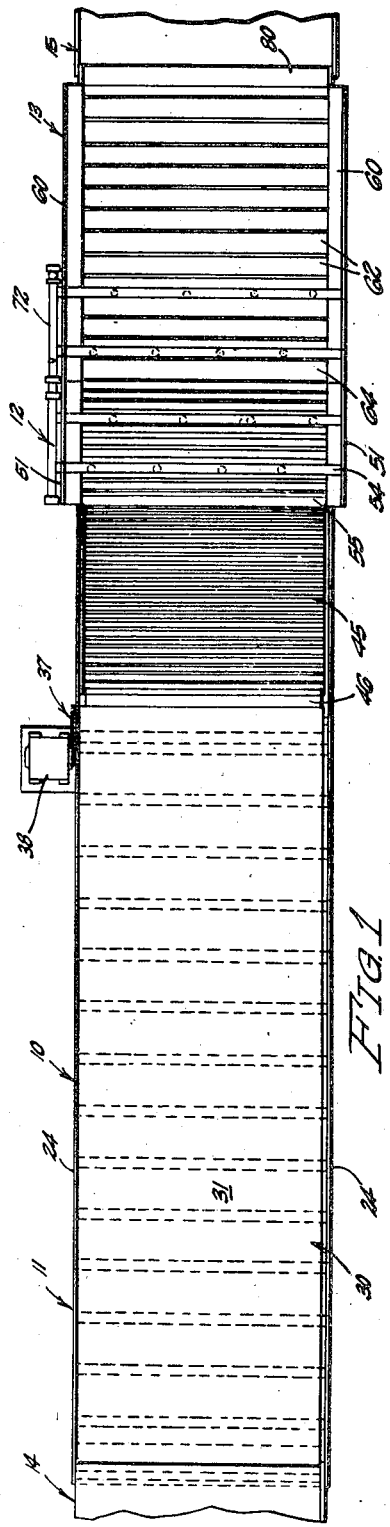
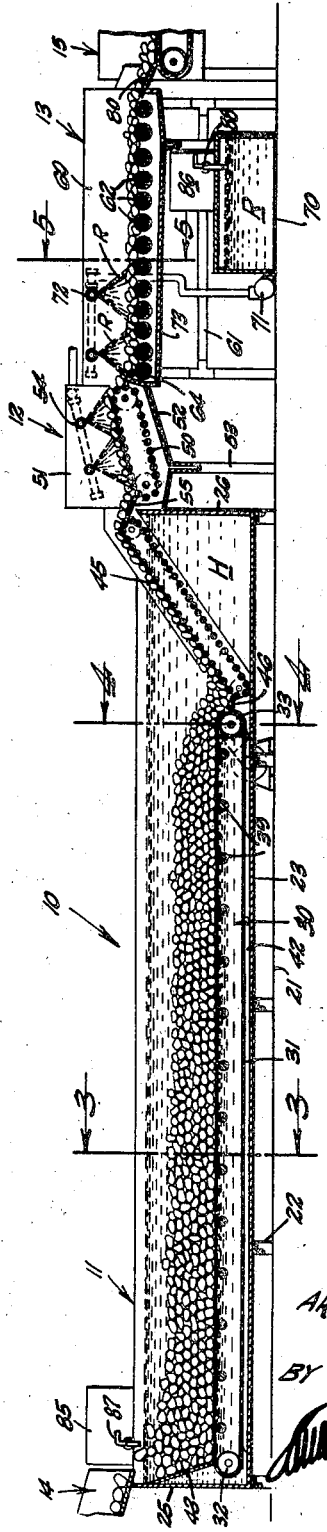
INVENTOR:
ARTHUR F. KALMAR
ATTORNEY March 25, 1947.                    A. F. KALMAR                    2,417,933
METHOD OF TREATING POTATOES
Filed Jan. 19, 1944                2 Sheets-Sheet 2
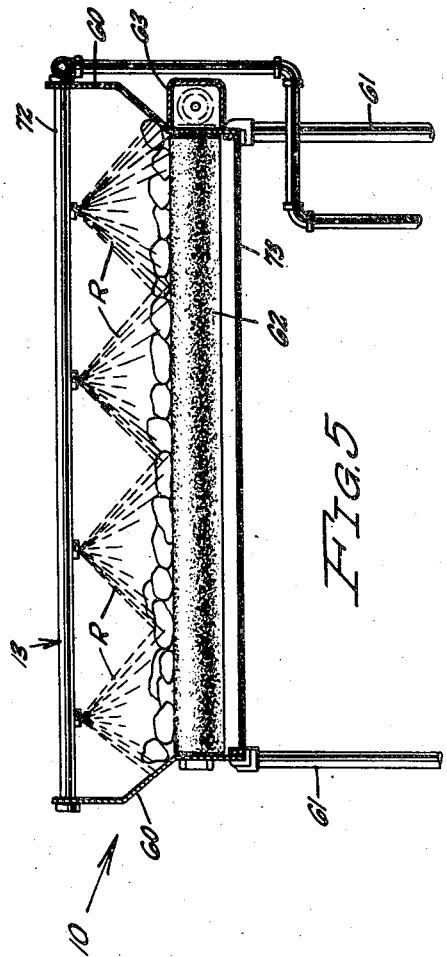
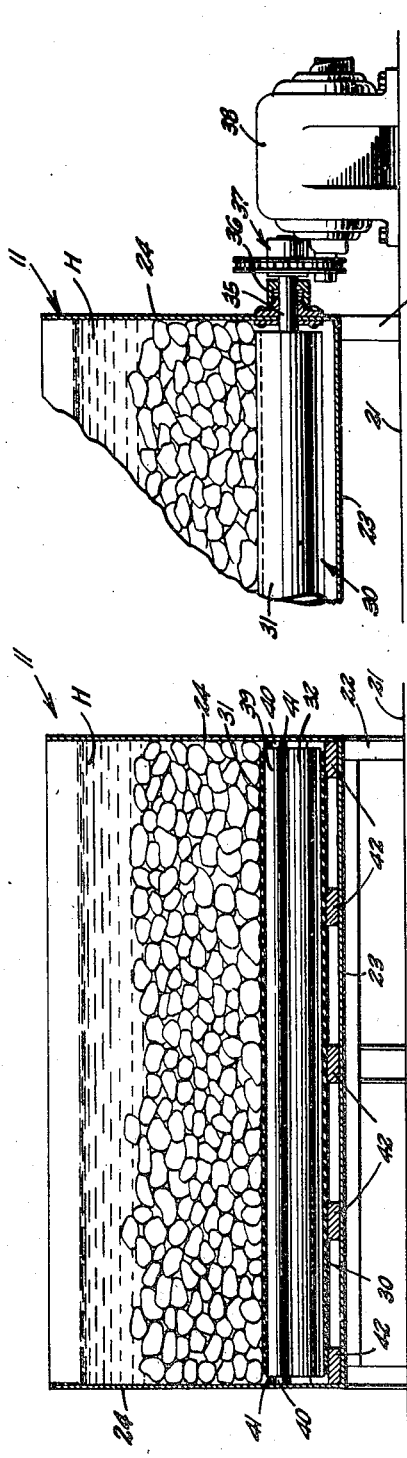
INVENTOR:
ARTHUR F. KALMAR
BY
ATTORNEY Patented Mar. 25, 1947

2,417,933

UNITED STATES PATENT OFFICE 2,417,933

METHOD OF TREATING POTATOES

Arthur F. Kalmar, Riverside, Calif., assignor to Food Machinery Corporation, San Jose, Calif., a corporation of Delaware Application January 19, 1944, Serial No. 518,842

10 Claims. (Cl. 99—156)

My invention relates to the art of commercially treating fresh fruits and vegetables and particularly potatoes in preparing these for storage or transmission to market.

This art is especially concerned with getting the product to the retail purchaser, fresh, clean, with an attractive appearance, and with as little decay as possible.

It is a broad object of the present invention to provide a method of and apparatus for treating potatoes before they are shipped so as to accomplish the aforesaid purposes.

One of the unsolved problems hitherto standing in the way of potatoes being satisfactorily cleaned is the difficulty of commercially removing *Rhizoctonia sclerotia* from these.

The fungus *Rhizoctonia solani* attacks a wide range of hosts, the most prevalent manifestation of the disease being found in its attack on potatoes which is popularly known as black scurf. This consists of hard, black to brown masses of the fungus, termed "sclerotia" which adhere firmly to the skin of the tuber. They vary greatly in size and shape. These sclerotia are composed of an extremely close weft of fungus threads and are in the form in which the fungus over-winters. They are harmless to the potato in this stage and unless they are present in large numbers do not injure the sale of tubers for table purposes. In cars with high humidity the sclerotia may resume growth, so that the resultant mold affects the price of the lot. The same fungus also induces russet scab.

The only known effort heretofore made to develop a suitable process for treating potatoes in commercial quantities to remove black scurf from the skin thereof, involved soaking the potatoes for long periods varying from one to fifteen hours in a solution of chlorinated lime. After being thus loosened, the sclerotia was removed from the potatoes by brushing.

This process had so many disadvantages that it was not commercially practicable. In the first place, the long soaking period greatly limited the quantities which could be handled with a reasonable investment in apparatus. Furthermore, the long soaking made it practically necessary to employ the batch system the operation of which is prohibitively expensive. In the third place, the brushing could only be effectively done by bristle brushes which are susceptible to the hypochlorite transmitted thereto by the potatoes, so that these brushes were ruined by chemical oxidation within a short time. Finally, soaking in the chlorinated lime for such a long period turned skinned areas on the potatoes a deep brown so as to impair the appearance of the potato by this discoloration as much or more than it was improved by the removal of the black scurf.

It is an object of the present invention to provide a method of and apparatus for removing black scurf from potatoes which is suitable for commercial operation and which lacks the disadvantages of the prior attempt to solve this problem described hereinabove.

The method and apparatus of my invention involve soaking the potatoes in water to remove dirt and organic matter therefrom, passing the potatoes continuously through an aqueous solution of a hypochlorite of an alkali-forming metal, removing the potatoes from said solution, rinsing most of the hypochlorite solution from the outer surfaces of the potatoes with a fresh water spray and then passing said potatoes through a brushing machine while playing streams of an aqueous solution of a reducing agent over the potatoes and brushes whereby all the residual hypochlorite on the potatoes is neutralized by conversion into inert chlorides before it can attack the material of the brushes. By alkali-forming metal, I mean those metals (like sodium and calcium) the oxides and hydroxides of which are commonly referred to as "alkalies."

While other hypochlorites may be used in the method of my invention, I preferably employ sodium hypochlorite with a strength of from 1 to 4% available chlorine. Very good results may be had by applying this agent at atmospheric temperature (70–90° F.) for a much shorter period than required for the previous treatment for sclerotia removal above mentioned. While a considerable removal of Rhizoctonia may be accomplished with my method with a sodium hypochlorite treatment of four minutes, it is preferable that this continue for twenty minutes, and where the infection of Rhizoctonia is unusually severe, the treatment should be extended to thirty minutes. I have found that a 1.2% available chlorine solution of sodium hypochlorite accomplishes a satisfactory loosening up of the *Rhizoctonia sclerotia* with my method, under all conditions ordinarily encountered when applied for twenty minutes at atmospheric temperature.

The treatment may be slightly speeded up by heating the hypochlorite solution to 110° Fahrenheit but this is not necessary. Normally, therefore, the process is performed at atmospheric temperature.

The method of my invention not only removes Rhizoctonia from the potatoes, but is useful in bleaching the skin of the potatoes. This bleaching action I have found is greatly speeded up if the pH of the hypochlorite solution is below 10. Although the solution of sodium hypochlorite used in my process, when first put in use has a pH slightly above 10, this drops below 10 within a short time due to the absorption of $CO_2$ from the air.

The hypochlorite employed in the method of my invention loosens up the sclerotia adhering to the skin of the potato by the exercise of a strong detergent action. The bleaching is effected by the oxidizing action of the hypochlorite. This oxidation also attacks skinned areas on the potato, however, tending to make these turn brown after the treatment.

The reducing agent used in my process may be selected from a group as follows: sulphites, bisulphites, metabisulphites and thio sulphates of alkali-forming metals. I have found sodium bisulphite to be especially suitable for use as this agent. The neutralization of the traces of hypochlorite remaining on the potatoes and particularly on the skinned areas to prevent their browning due to oxidation by the hypochlorite may generally be effected by applying a solution of .25% to 1.5% of sodium bisulphite to the potatoes while these are being brushed for a period of from 15 to 40 seconds. This period of brushing is likewise entirely adequate to remove the sclerotia from the potatoes.

I prefer to apply an excess of the reducing agent in the second treatment over that required to neutralize the hypochlorite remaining on the potatoes and then let the reducing agent solution dry on the potatoes. I depend upon the reducing agent treatment of my method to counteract the browning effect of the hypochlorite treatment on the skinned areas. The presence of the reducing agent on the potato skin after processing according to my invention continues to retard enzymatic oxidation of the skinned areas and their subsequent discoloration while the potatoes are on their way to market. The presence of this reducing agent also acts to protect the potato against reinoculation by spoilage organisms.

The values given are illustrative and considerable variation in the choice of agents and concentrations used and the periods of treatment are allowable while retaining substantially the novel benefits of my invention.

The manner of accomplishing the foregoing objects, as well as further objects and advantages, will be made manifest in the following description of a preferred embodiment of the method and apparatus of the invention taken in connection with the accompanying drawings in which:

Fig. 1 is a plan view of a preferred embodiment of the apparatus of my invention.

Fig. 2 is a diagrammatic longitudinal sectional view of said apparatus taken on the line 2—2 of Fig. 1.

Fig. 3 is an enlarged diagrammatic cross sectional view taken on the line 3—3 of Fig. 2 and illustrating the construction of the chlorination tank and the potato supporting conveyor therein and the bottom thereof.

Fig. 4 is a fragmentary enlarged cross sectional view taken on the line 4—4 of Fig. 2 and showing the mechanism for driving the aforesaid conveyor.

Fig. 5 is an enlarged cross sectional view taken on the line 5—5 of Fig. 2 and illustrating the construction of the brushing machine of the apparatus of my invention in which the black scurf is scrubbed from the potatoes in the presence of a reducing agent.

Referring specifically to the drawings the apparatus 10 therein disclosed includes a hypochlorite solution tank 11, a rinser 12 and a brushing machine 13. Potatoes are delivered to the apparatus 10 from a chute 14 and are discharged therefrom into a dryer 15.

The hypochlorite tank 11 is supported above the floor 21 on a frame 22, and has a bottom 23 resting on said frame, side walls 24 and end walls 25 and 26. Provided in the lower portion of the tank 11 is a potato conveyor 30 which includes an endless rubber belt 31 trained about an idle pulley 32 and a drive pulley 33 these pulleys being rotatively mounted on the side walls 24. The pulley 33 has a drive shaft 35 which extends through a bearing and stuffing box 36 provided in one of the walls 24 and is driven through a chain and sprocket mechanism 37 by a geared electric motor 38.

The upper flight of the belt 31 is supported by a series of rollers 39, trunnions 40 of which rotatably journal in bearings 41 provided on the inner faces of the side walls 24. The lower flight of the belt 31 rests upon a series of longitudinal supports 42.

The chute 14 rests on the upper end of the tank wall 25 and an inclined baffle board 43 is mounted beneath the discharge end of this chute to prevent potatoes delivered from the chute 14 onto the conveyor 30 from gravitating rearwardly and downwardly between the conveyor 30 and the end wall 25.

Disposed in the discharge end of the tank 11 between the discharge end of the conveyor 30 and the tank end wall 26 is an elevator 45 which is of the conventional travelling transverse roller type, potatoes discharged from the conveyor 30 being delivered over a drop board 46 onto the lower end of the elevator 45.

The rinser 12 includes a short endless conveyor 50 mounted between side walls 51 and having a drain pan 52 from which a pipe 53 conducts rinse water collected thereby to the sewer. A spray manifold 54, mounted to overlie conveyor 50, connects with the domestic water system so as to spray fresh water downwardly onto potatoes carried on this conveyor.

Mounted on the elevator 45 for delivering potatoes from the discharge end thereof to the receiving end of the conveyor 50 is a drop board 55.

The brushing machine 13 includes side walls 60 mounted on a frame 61 and supporting a series of rotary brushes 62 which are all provided with suitable drive mechanism 63 (see Fig. 5) for rotating these in a common direction with their upwardly disposed surfaces travelling in a direction away from the receiving end of the brusher and toward the discharge end thereof. Supported between the walls 60 in a position to receive potatoes from the discharge end of the conveyor 50 and transfer these onto the brushes 62 is a drop board 64.

Beneath the brushing machine 13 is a tank 70 which is adapted to contain an aqueous solution of reducing agent R. Connected with this tank is a power-driven pump 71 which draws solution R from the tank and delivers this to a spray manifold 72 overlying the brushes 62 and from which the solution R is sprayed or flooded onto potatoes supported on and being brushed by these brushes. The brushing machine 13 is also provided with a drain pan 73 for collecting solution R draining downwardly from the brushes 62 and returning this through a pipe 74 to the tank 70.

The dryer 15 is located adjacent the discharge end of the brushing machine 13 so that potatoes discharged from this machine are delivered to the dryer 15 over a drop board 80.

Reservoirs 85 and 86 having valves 87 and 88 are mounted over the tanks 11 and 70 respectively and are adapted to contain concentrated solutions to be fed slowly through the valves 87 and 88 to keep solutions H and R at their desired standard strengths.

Operation

To prepare the apparatus 10 for commercial operation, tanks 11 and 70 are charged with primary and secondary treating solutions H and R and the reservoirs 85 and 86 are charged with quantities of concentrates of these solutions and the valves 87 and 88 turned on to permit trickling of the concentrates into the respective solutions to maintain the strength of the latter within suitable operating limits. The motor 38 is now energized to cause it to set the conveyor 30 in motion, and power is also applied from prime movers (not shown) to the elevator 45, conveyor 50, brushes 62, pump 71 and dryer 15 to cause these all to function in the well known manner. The fresh water spray manifold 54 is also connected up with a source of fresh water under pressure, so that fresh water sprays are emitted downwardly from this manifold onto the conveyor 50. The pump 71 when energized operates, as already described, to withdraw solution R from the tank 70 and spray this downwardly from the manifold 72 onto the rotating brushes 62.

It is generally the practice to wash potatoes in preparing these for market and it is assumed that before processing the potatoes, they are first washed. This washing step removes the dirt and organic matter loosely adhering to the potatoes. The washed potatoes are then delivered through the chute 14 into the hypochlorite treating tank 11 where they sink onto the conveyor 30. This moves at such a slow rate that potatoes travelling thereon are subjected to the solution H for the desired length of time which ordinarily is about 20 minutes. This period may be shortened or lengthened as desired by controlling the speed of the conveyor 30. The tank 11 is relatively large in order to give the apparatus 10 the desired commercial capacity and still permit potatoes to remain in the hypochlorite solution for 20 to 30 minutes.

This mode of operation causes the potatoes to pile up on the conveyor 30 in the tank 11 so that a fairly deep layer of potatoes is carried on this conveyor throughout the length of the latter. The elevator 45, of course, operates at a considerably faster speed than the conveyor 30, so as to be able to carry away potatoes as these sink downwardly on reaching the discharge end of the conveyor 30. The elevator 45 thus delivers a stream of potatoes to the rinser 12 of substantially the same volume as is delivered to the tank 11 through the chute 14.

In the rinser 12 the fresh water sprays wash off most of the hypochlorite solution adhering to the potatoes so that only traces of this solution remain on the potatoes when they are delivered to the brusher 13. These traces of hypochlorite which it is practically impossible to remove from the potatoes by rinsing, are sufficient to destroy the brushes in the brushing machine 13 within a relatively short period of commercial operation and would do so excepting for the presence of the sprays of reducing solution delivered onto the potatoes and brushes 62 through the manifold 72.

The action of the brushes 62 on the potatoes in the machine 13 is to remove the loosened sclerotia from the potatoes by lightly brushing and rotating these and feeding them from valley to valley until the potatoes progress through the washing machine and are discharged into the dryer 15. After passing through the dryer the potatoes may be sorted or otherwise graded and placed in sacks for shipment.

The treatment of potatoes infected with *Rhizoctonia solani* by the process of my invention above described not only loosens up and brushes off the sclerotia or black scurf adhering to the skin of the potato so as to completely remove this blemish and thus greatly improve the appearance of the potato, but the hypochlorite bath has a strong oxidizing effect on the potato skin as a whole, thus bleaching and greatly lightening the potato skins. The oxidizing action of the hypochlorite, however, tends to destroy the brushes 62 as well as produce a yellowing of the skins and subsequent browning of the skinned areas on the potatoes, both of which are counteracted by the reducing agent applied in the brushing machine 13 without reversing the bleaching effect of the hypochlorite on the potato skins. Thus the potatoes treated by the process of my invention not only have the Rhizoctonia removed, but have the potato skins generally lightened in tone so that they present a much more attractive appearance when they reach market.

The hypochlorite bath furthermore is highly fungicidal in character and has a marked sterilizing action on the decay organisms with which the potatoes may have been infected in the washer.

A multiplicity of mutually supplementary benefits are thus seen to be produced in the treatment of the potatoes by the method of my invention.

While I prefer to apply the reducing agent to the potatoes while these are being brushed, it is possible to secure much of the benefit of my invention by applying this agent to the potatoes in between the hypochlorite and the brushing steps. For instance it is practical to apply the reducing agent in the rinse water, in which case the spray of reducing agent in the brusher could be reduced or eliminated, and the brushes would still be protected from attack by the hypochlorite.

I claim:

1. A method of removing black scurf from potatoes which consists in: subjecting said potatoes to the detergent action of a solution of a hypochlorite of an alkali-forming metal, and brushing said potatoes to remove said black scurf in the presence of a reducing agent which reduces to inert chlorides any hypochlorite remaining on the potatoes.

2. A method of removing black scurf from potatoes which consists in: subjecting said potatoes to the detergent action of a solution of a hypochlorite of an alkali-forming metal, rinsing said potatoes, and brushing said potatoes to remove said black scurf in the presence of a reducing agent which reduces to inert chlorides any hypochlorite remaining on the potatoes.

3. A method of removing black scurf from potatoes which consists in: submerging said potatoes from 4 to 30 minutes in a solution of a hypochlorite of an alkali-forming metal containing from 1% to 4% available chlorine; rinsing said potatoes; and brushing said potatoes in the presence of an aqueous solution containing a reducing agent selected from a group consisting of sulphites, bisulphites, metabisulphites and thiosulphates of alkali-forming metals.

4. A method of removing black scurf from potatoes which consists in: submerging said potatoes from 4 to 30 minutes in a solution of sodium hypochlorite containing from 1% to 4% available chlorine; rinsing said potatoes; and brushing said potatoes in the presence of an aqueous solution containing a reducing agent selected from a group consisting of sulphites, bisulphites, metabisulphites and thiosulphates of alkali-forming metals.

5. A method of removing black scurf from potatoes which consists in: soaking said potatoes in a solution of sodium hypochlorite until said scurf becomes loosened by the detergent action of said hypochlorite thereon; rinsing said solution from said potatoes and briefly brushing said potatoes in the presence of a reducing agent which reduces to inert chlorides any residual hypochlorite which was not removed from the potatoes by said rinse.

6. A method of removing black scurf from potatoes which consists in: soaking said potatoes in a solution of sodium hypochlorite until said scurf becomes loosened by the detergent action of said hypochlorite thereon; rinsing said solution from said potatoes; and briefly brushing said potatoes in the presence of an aqueous solution containing a reducing agent selected from a group consisting of sulphites, bisulphites, metabisulphites, and thiosulphates of alkali-forming metals.

7. A method of removing black scurf from potatoes which consists in: soaking said potatoes in a solution of sodium hypochlorite until said scurf becomes loosened by the detergent action of said hypochlorite thereon; rinsing said solution from said potatoes; and briefly brushing said potatoes in the presence of an aqueous solution containing a reducing agent selected from a group consisting of sulphites, bisulphites, metabisulphites, and thiosulphates of alkali-forming metals; and drying said potatoes with the residual reducing agent remaining thereon.

8. A method of removing black scurf from potatoes which consists in: subjecting said potatoes to the detergent action of a solution of a hypochlorite of an alkali-forming metal, subjecting said potatoes to an aqueous solution of a reducing agent which reduces to inert chlorides any hypochlorite remaining on the potatoes, and brushing said potatoes to remove the black scurf loosened up by said hypochlorite.

9. A method of removing black scurf from potatoes which consists in: soaking said potatoes in a solution of sodium hypochlorite until said scurf becomes loosened by the detergent action of said hypochlorite thereon; and brushing said potatoes in the presence of a solution of .25% to 1.5% of sodium bisulfite.

10. A method of removing black scurf from potatoes which consists in: submerging said potatoes from four to thirty minutes in a solution of a hypochlorite of an alkali-forming metal containing from 1% to 4% available chlorine; and brushing said potatoes in the presence of a solution of from .25% to 1.5% of sodium bisulfite.

ARTHUR F. KALMAR.

REFERENCES CITED

The following references are of record in the file of this patent:

UNITED STATES PATENTS

| Number | Name | Date |
| --- | --- | --- |
| 1,842,696 | Slater | Jan. 26, 1932 |
| 1,813,127 | Slater | July 7, 1931 |
| 2,241,436 | Williams | May 13, 1941 |
| 1,717,869 | Blumenthal | June 18, 1929 |
| 1,852,144 | Brogden et al. | Apr. 5, 1932 |
| 2,348,946 | Wilson | May 16, 1944 |